US008986885B2

(12) United States Patent
Tanaka et al.

(10) Patent No.: US 8,986,885 B2
(45) Date of Patent: Mar. 24, 2015

(54) LITHIUM ION BATTERY

(75) Inventors: Akihide Tanaka, Hitachinaka (JP); Etsuko Nishimura, Hitachiota (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 1073 days.

(21) Appl. No.: 13/028,243

(22) Filed: Feb. 16, 2011

(65) Prior Publication Data

US 2011/0206988 A1 Aug. 25, 2011

(30) Foreign Application Priority Data

Feb. 25, 2010 (JP) ................................. 2010-040618

(51) Int. Cl.
*H01M 4/13* (2010.01)
*H01M 4/505* (2010.01)
*H01M 4/525* (2010.01)
*H01M 4/58* (2010.01)
*H01M 4/587* (2010.01)
*H01M 4/62* (2006.01)
*H01M 10/0525* (2010.01)
*H01M 4/64* (2006.01)
*H01M 4/36* (2006.01)
*H01M 4/131* (2010.01)

(52) U.S. Cl.
CPC ................ *H01M 4/505* (2013.01); *H01M 4/64* (2013.01); *H01M 4/36* (2013.01); *H01M 4/131* (2013.01); *H01M 4/525* (2013.01); *H01M 4/5825* (2013.01); *H01M 4/587* (2013.01); *H01M 4/625* (2013.01); *H01M 10/0525* (2013.01); *Y02E 60/122* (2013.01); *Y02T 10/7011* (2013.01)
USPC .................. 429/231.1; 429/231.3; 429/231.2; 429/231.8; 429/231.4; 429/233; 429/232

(58) Field of Classification Search
CPC ....... H01M 4/131; H01M 4/36; H01M 4/505; H01M 4/525; H01M 4/587; H01M 4/64; H01M 10/0525; H01M 2004/027; H01M 2004/028; H01M 2220/20; Y02E 60/122
USPC .......... 429/231.1, 231.3, 231.2, 231.8, 231.4, 429/233, 232
See application file for complete search history.

(56) References Cited

U.S. PATENT DOCUMENTS

| 7,629,085 B2 | 12/2009 | Abe et al. |
| 7,871,728 B2 | 1/2011 | Minami et al. |
| 2008/0076032 A1 | 3/2008 | Wakita et al. |
| 2009/0017374 A1 | 1/2009 | Saito et al. |

FOREIGN PATENT DOCUMENTS

| JP | 9204936 | | 8/1997 |
| JP | 2001-110405 | * | 4/2001 |
| JP | 2001110405 | | 4/2001 |
| JP | 2003-272625 | | 9/2003 |
| JP | 2008-41465 | | 2/2008 |
| JP | 2008103311 | | 5/2008 |
| JP | 2008218248 | | 9/2008 |
| JP | 2008-3055688 | * | 12/2008 |
| JP | 2009038018 | | 2/2009 |
| JP | 2009-135045 | | 6/2009 |
| WO | WO 2005/117197 A1 | | 12/2005 |

OTHER PUBLICATIONS

JP Office Action of Appln. No. 2010-040618 dated May 21, 2013.

* cited by examiner

*Primary Examiner* — Laura Weiner
(74) *Attorney, Agent, or Firm* — Baker Botts LLP

(57) ABSTRACT

An object of the present invention is to provide a lithium ion battery which is excellent in properties at large current and can be applied to applications requiring high output power even when the mixture layers are made thick. The present invention provides a lithium ion battery including a positive electrode including a positive electrode mixture layer formed on a current collector, a negative electrode including a negative tive electrode mixture layer formed on a current collector and an electrolyte, the positive electrode and the negative electrode being disposed through the intermediary of a separator, wherein the positive electrode includes as a positive electrode active material a lithium composite oxide represented by $LiNi_aMn_bCO_cM_dO_2$ (in the formula, M is at least one selected from the group consisting of Fe, V, Ti, Cu, Al, Sn, Zn, Mg, B and W, $a+b+c+d=1$, $0.2 \leq a \leq 0.8$, $0.1 \leq b \leq 0.4$, $0 \leq c \leq 0.4$ and $0 \leq d \leq 0.1$), the negative electrode includes graphite as a negative electrode active material, the interlayer distance ($d_{002}$) of the graphite is 0.335 nm or more and 0.338 nm or less, the one-side thickness A (μm) of the positive electrode mixture layer is 60 or more and 85 or less, the product A×B between the one-side thickness A and the density B (g/cm$^3$) of the positive electrode mixture layer is 160 or more and 220 or less, the one-side thickness C (μm) of the negative electrode mixture layer is 40 or more and 75 or less, and the product C×D between the one-side thickness C and the density D (g/cm$^3$) of the negative electrode mixture layer is 65 or more and 105 or less.

5 Claims, 4 Drawing Sheets

LITHIUM ION BATTERY

BACKGROUND OF THE INVENTION

1. Field of the Invention

The present invention relates to a lithium ion battery.

2. Background Art

Since 1980 or later, in particular, since the 1990s, with the development of cellular phones or laptop PCs, secondary batteries to be used as the electric power supplies for such devices have been required to be made higher in performances. Under such circumstances, lithium ion batteries (lithium ion secondary batteries), which have high energy densities, are mainly used as the secondary batteries in place of lead batteries or nickel-metal hydride batteries.

Recently, lithium ion batteries are higher in battery voltages and have higher output properties as compared to nickel-metal hydride batteries or lead batteries, and hence lithium ion batteries have attracted attention as the high output electric power supplies for electric automobiles or hybrid electric automobiles, or devices such as electric tools. For the purpose of applying lithium ion batteries to the applications requiring high output power such as electric automobiles or electric tools, it is required to attain larger current and more satisfactory output properties than in the application to the devices such as cellular phones. For example, in a (plug-in) hybrid automobile which at first travels by using only electric power of a battery and travels by using an engine in combination with the battery when the battery capacity comes to be lower than a certain value, a lithium ion battery which attains a high energy density while maintaining high output properties is required.

Examples of a method for increasing the energy density may include a method in which the capacity density of the material concerned is increased; however, the capacity of graphite mainly used as the negative electrode material for lithium ion batteries has already been improved in performances so as to be close to the theoretical capacity, and hence such a method as described above is not expected to provide any solution for increasing the energy density.

JP Patent Publication (Kokai) No. 9-204936 A (1997) discloses a method in which the energy density of a battery is increased by reducing the relative proportion of a current collector or a separator through increasing the thickness of each of the positive and negative electrode mixture layers. However, in JP Patent Publication (Kokai) No. 9-204936 A (1997), in each of the positive and negative electrodes, the thickness of the mixture layer is made to have a one-side thickness of 125 μm or more, and hence the thickness of the electrode is increased and consequently the properties at large current in applications requiring high output power are degraded.

Additionally, JP Patent Publication (Kokai) No. 2008-218248 A discloses a lithium ion battery in which the density of the negative electrode mixture is 1.4 g/cm³ or more and 1.7 g/cm³ or less and the coating amount of the negative electrode mixture on the both sides of the current collector is 6 mg/cm² or more and 8 mg/cm² or less. It is stated that under such conditions, the contact with the electrolyte in the active material interface is ensured and satisfactory output properties at large current can be ensured. However, in JP Patent Publication (Kokai) No. 2008-218248 A, the one-side thickness of the negative electrode mixture layer is approximately 28 μm at a maximum, and under such conditions, such a high energy density as required for plug-in hybrid electric automobiles cannot be attained.

In contrast to the above-described cases, JP Patent Publication (Kokai) No. 2008-103311 A discloses a method in which the electrolyte includes 4-fluoro-1,3-dioxolan-2-one and a satisfactory coating film is formed on the negative electrode, and consequently the 1 C cycle properties can be improved even when the one-side thickness of the negative electrode mixture layer comes to be as thick as 120 μm (the term 1 C means the current value at which the theoretical capacity can be completely discharged in an hour).

SUMMARY OF THE INVENTION

The present inventors made a study and consequently found that the cause for degrading the properties at large current, important in applications requiring high output power is ascribable to the fact that the diffusion process of lithium ion is rate determining due to the increased diffusion distance of lithium ion in the electrode. Therefore, the formation of a satisfactory coating film on the negative electrode as performed in JP Patent Publication (Kokai) No. 2008-103311 A does not provide any solution for overcoming the degradation of the properties at large current. Accordingly, an object of the present invention is to provide a lithium ion battery which is excellent in properties at large current and can be applied to applications requiring high output power even when the mixture layers are made thick.

The gist of the present invention for solving the above-described problems is as follows.

(1) A lithium ion battery including a positive electrode including a positive electrode mixture layer formed on a current collector, a negative electrode including a negative electrode mixture layer formed on a current collector and an electrolyte, the positive electrode and the negative electrode being disposed through the intermediary of a separator, wherein the positive electrode includes as a positive electrode active material a lithium composite oxide represented by $LiNi_aMn_bCO_cM_dO_2$ (in the formula, M is at least one selected from the group consisting of Fe, V, Ti, Cu, Al, Sn, Zn, Mg, B and W, a+b+c+d=1, $0.2 \leq a \leq 0.8$, $0.1 \leq b \leq 0.4$, $0 \leq c \leq 0.4$ and $0 \leq d \leq 0.1$), the negative electrode includes graphite as a negative electrode active material, the interlayer distance ($d_{002}$) of the graphite is 0.335 nm or more and 0.338 nm or less, the one-side thickness A (μm) of the positive electrode mixture layer is 60 or more and 85 or less, the product A×B between the one-side thickness A and the density B (g/cm³) of the positive electrode mixture layer is 160 or more and 220 or less, the one-side thickness C (μm) of the negative electrode mixture layer is 40 or more and 75 or less, and the product C×D between the one-side thickness C and the density D (g/cm³) of the negative electrode mixture layer is 65 or more and 105 or less.

(2) The lithium ion battery according to (1), wherein (A×B)/(C×D) is 2.0 or more and 2.3 or less.

(3) A lithium ion battery including a positive electrode including a positive electrode mixture layer formed on a current collector, a negative electrode including a negative electrode mixture layer formed on a current collector and an electrolyte, the positive electrode and the negative electrode being disposed through the intermediary of a separator, wherein the positive electrode includes as a positive electrode active material a lithium composite oxide represented by $LiMPO_4$ (in the formula, M is at least one selected from Fe and Mn), the negative electrode includes graphite as a negative electrode active material, the interlayer distance ($d_{002}$) of the graphite is 0.334 nm or more and 0.338 nm or less, the one-side thickness A (μm) of the positive electrode mixture layer is 100 or more and 150 or less, the product A×B between the one-side thickness A and the density B (g/cm$^3$) of the positive electrode mixture layer is 200 or more and 250 or less, the one-side thickness C (m) of the negative electrode mixture layer is 40 or more and 75 or less, and the product C×D between the one-side thickness C and the density D (g/cm$^3$) of the negative electrode mixture layer is 65 or more and 105 or less.

(4) The lithium ion battery according to (3), wherein (A×B)/(C×D) is 2.3 or more and 2.6 or less.

(5) The lithium ion battery according to any one of (1) to (4), wherein at least one of the positive electrode mixture layer and the negative electrode mixture layer further includes carbon fiber.

(6) The lithium ion battery according to any one of (1) to (5), wherein the pores possessed by the graphite are such that when the volume of the pores having a pore diameter of 1 nm or more and less than 5 nm is represented by V1 and the volume of the pores having a pore diameter of 5 nm or more and less than 100 nm is represented by V2, V1/V2 is 0.01 or more and 0.10 or less.

(7) The lithium ion battery according to any one of (1) to (6), wherein the interlayer distance ($d_{002}$) of the graphite is 0.336 nm or more and 0.337 nm or less.

(8) The lithium ion battery according to any one of (1) to (7), having an energy density of 80 Wh/kg or more, for use in applications to electric automobiles or plug-in hybrid automobiles.

The present invention can provide a lithium ion battery in which satisfactory properties at large current are obtained and the energy density is high even when the electrode mixture layers are thick.

DESCRIPTION OF SYMBOLS

Figure 1:
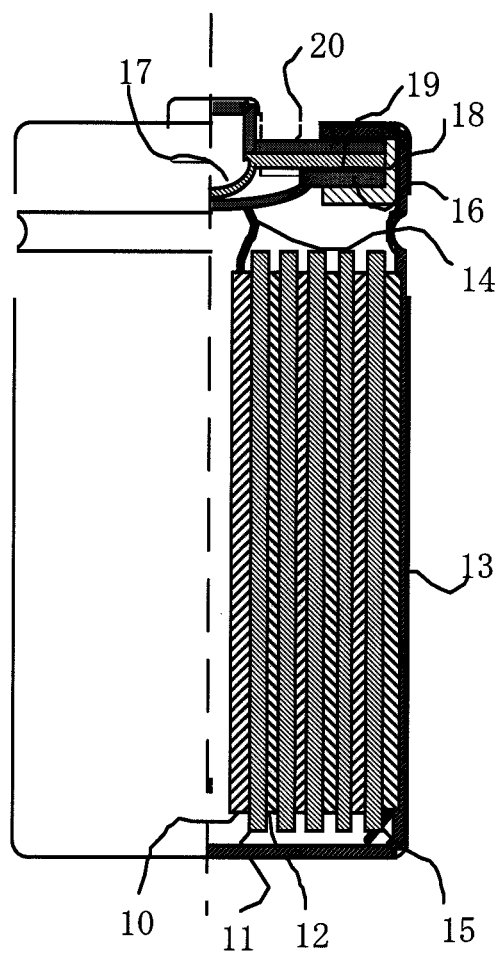
FIG. 1 is a cross sectional view of a lithium ion battery prepared in an Example of the present invention.

10 Positive electrode
11 Separator
12 Negative electrode
13 Battery can
14 Positive electrode tab
15 Negative electrode tab
16 Inner lid
17 Internal pressure release valve
18 Gasket
19 PTC element
20 Battery lid

DETAILED DESCRIPTION OF THE PREFERRED EMBODIMENTS

According to the study made by the present inventors, the properties at large current are such that the variations of the concerned properties are small until the thickness of each of the positive electrode and negative electrode mixture layers and the product between the thickness and the density of the mixture layer in each of the positive electrode and the negative electrode reach certain specific values, and the properties at large current are degraded steeply in the narrow regions where such specific values are exceeded. As a result of a further study made by the present inventors, it has been found that the cause for the steep degradation of the properties at large current occurring when the thickness of each of the mixture layers is made to exceed a certain specific value is ascribable to the transition of the rate-determining step from the process in which the lithium ions in the positive and negative electrode active materials are intercalated/deintercalated to the diffusion process of the lithium ions in the positive and negative electrode mixture layers, wherein the transition is caused by the thickness increase which delays the supply of the lithium ion present in the bulk component of the electrolyte.

In the first place, when the battery is discharged in the lithium ion battery, the following four events occur simultaneously: the deintercalation of lithium ion from the negative electrode active material, the migration of lithium ion in the negative electrode mixture layer, the intercalation of lithium ion into the positive electrode mixture layer and the migration of lithium ion in the positive electrode mixture layer. The migration of lithium ion is controlled by the slowest step of these steps, namely, the rate-determining step, and hence the properties at large current are also affected by such a rate-determining step.

Accordingly, under the conditions in which the rate-determining step is controlled by the deintercalation process of lithium ion from the negative electrode active material and the intercalation process of lithium ion into the positive electrode active material in the positive and negative electrode mixtures, the properties at large current is dependent on the concerned materials and is little affected by thickness of each of the mixture layers, and hence the properties at large current are not degraded; thus, by making the mixture layers thick to such an extent that the migration in each of the mixture layers is not rate-determining, it is possible to prepare a lithium ion battery having a high energy density. In this case, it is insufficient that the mixture layer in which the diffusion of lithium ion is not a rate-determining step is restricted to either one of the positive and negative electrodes; it is essential that the diffusion of lithium ion is not a rate-determining step in both of the mixture layer of the positive electrode and the mixture layer of the negative electrode.

For the purpose of avoiding the condition in which the rate-determining step at large current is one or both of the diffusion processes of lithium ion in the positive electrode mixture layer and the diffusion process of lithium ion in the negative electrode mixture layers, it is important to ensure the diffusion paths of lithium ion in the electrodes, and accordingly, from this viewpoint, the product between the thickness and the density of each of the mixture layers is specified so as to fall within a certain range.

Specifically, the negative electrode in the present invention is constituted with a negative electrode mixture layer and a current collector, wherein the negative electrode mixture layer is mainly composed of graphite as a negative electrode active material, the one-side thickness C (μm) of the negative electrode mixture layer is 40 or more and 75 or less, the product C×D between the one-side thickness C and the density D (g/cm³) of the negative electrode mixture layer is 65 or more and 105 or less. When the thickness of the mixture layer exceeds 75 μm or when C×D exceeds 105, the properties at large current are steeply degraded. When the thickness of the mixture layer is less than 40 μm or when C×D is less than 75, the energy density of the battery is decreased. In consideration of the balance between the energy density and the properties at large current, C×D is preferably 65 or more and 95 or less and particularly preferably 75 or more and 85 or less.

In an embodiment of the present invention, the positive electrode is constituted with a positive electrode mixture layer and a current collector, wherein the positive electrode mixture layer is mainly composed of a lithium composite oxide represented by $LiNi_aMn_bCo_cM_dO_2$ as a positive electrode active material, the spacing $d_{002}$ of the (002) planes (the interlayer distance of graphite) in the negative electrode obtained by measurement with an X-ray diffractometer (XRD) is 0.335 nm or more and 0.338 nm or less, the one-side thickness A (μm) of the positive electrode mixture layer is 60 or more and 85 or less, the product A×B between the one-side thickness A and the density B (g/cm³) of the positive electrode mixture layer is 160 or more and 220 or less. In the lithium composite oxide, M is at least one selected from the group consisting of Fe, V, Ti, Cu, Al, Sn, Zn, Mg, B and W, a+b+c+d=1, 0.1≤b≤0.4, 0≤c≤0.4 and 0≤d≤0.1. When the thickness of the positive electrode mixture layer exceeds 85 μm or when A×B exceeds 220, the properties at large current is steeply aggravated. When the thickness of the positive electrode mixture layer is less than 60 μm or when A×B is less than 160, the energy density of the battery is decreased. In consideration of the balance between the energy density and the properties at large current, A×B is preferably 170 or more and 210 or less and particularly preferably 180 or more and 200 or less.

Additionally, in another embodiment, the positive electrode is constituted with a positive electrode mixture layer and a current collector, wherein the positive electrode mixture layer is mainly composed of a lithium composite oxide represented by $LiMPO_4$ as a positive electrode active material, the spacing $d_{002}$ of the (002) planes (the interlayer distance of graphite) in the negative electrode obtained by measurement with an X-ray diffractometer (XRD) is 0.334 nm or more and 0.338 nm or less, the one-side thickness A (μm) of the positive electrode mixture layer is 100 or more and 150 or less, the product A×B between the one-side thickness A and the density B (g/cm³) of the positive electrode mixture layer is 200 or more and 250 or less. In the lithium composite oxide, M is at least one selected from Fe and Mn. When the thickness of the positive electrode mixture layer exceeds 150 μm or when A×B exceeds 250, the properties at large current is steeply aggravated. When the thickness of the positive electrode mixture layer is less than 100 μm or when A×B is less than 200, the energy density of the battery is decreased. In consideration of the balance between the energy density and the properties at large current, A×B is preferably 200 or more and 230 or less and particularly preferably 210 or more and 220 or less.

When $LiMPO_4$ is used as a positive electrode active material, the optimal range of the product A×B between the one-side thickness and the density is different as compared to the optimal range for $LiNi_aMn_bCo_cM_dO_2$; in the case of $LiMPO_4$, even when the mixture layer is thicker, the rate-determining step at large current is not the diffusion process of lithium ion in the positive electrode. It is inferred that this is because the primary particles of $LiMPO_4$ are smaller in particle size than the primary particles of $LiNi_aMn_bCo_cM_dO_2$ and it is difficult for the primary particles of $LiMPO_4$ to aggregate into the secondary particles in contrast to the case of $LiNi_aMn_bCo_cM_dO_2$, and hence it is easier to ensure the diffusion path for lithium ion in $LiMPO_4$.

Additionally, it has been found that by equalizing the diffusivity of lithium ion in the positive electrode and the diffusivity of lithium ion in the negative electrode, a further higher energy density can be obtained. In a lithium ion battery, the intercalation and deintercalation in the positive electrode and the negative electrode occur simultaneously, and hence even when one of the positive and negative electrodes is excellent in diffusivity, the properties at large current are dependent on the electrode inferior in diffusivity and consequently no intended effect is obtained. Therefore, by making the diffusivity of lithium ion in the positive electrode and the diffusivity of lithium ion in the negative electrode as close as possible to each other, a high energy density can be attained while the properties at large current are being satisfactorily maintained. Specifically, when $LiNi_aMn_bCo_cM_dO_2$ is used as a positive electrode active material, the value of (A×B)/(C×D) is preferably set at 2.0 or more and 2.3 or less and particularly preferably at 2.1 or more and 2.2 or less; when $LiMPO_4$ is used as a positive electrode active material, the value of (A×B)/(C×D) is preferably set at 2.3 or more and 2.6 or less and particularly preferably at 2.4 or more and 2.5 or less.

Additionally, by further adding carbon fiber as a void ensuring material to at least one of the positive electrode mixture layer and the negative electrode mixture layer, preferably the diffusivity of lithium ion in the electrode can be further improved. Carbon fiber has a large aspect ratio (longitudinal to transverse ratio) and a strong strength, can maintain the shape thereof even under strong pressing, and hence can penetrate between the constituents of the active substance so as to maintain the diffusion path in the electrode. The aspect ratio of the carbon fiber to be added is preferably 5 or more and particularly preferably 10 or more. In each of the positive electrode mixture layer and the negative electrode mixture layer, the addition amount of carbon fiber is preferably set at 10% by weight of the total amount of the mixture layer.

Additionally, for graphite as the negative electrode active material, a material having a small number of small pores on the surface thereof is preferably used. In pulverization treatment, the surface of graphite tends to undergo the occurrence of pores referred to as mesopores in terms of the classification according to IUPAC. Among such pores, in particular, the pores of 5 nm or less in diameter obstruct smooth movement therethrough of the solvated lithium ion, and hence the reduction of such pores on the surface enables to enhance the diffusivity of lithium ion. Specifically, when the volume of the pores having a pore diameter of 1 nm or more and less than 5 nm is represented by V1 and the volume of the pores having a pore diameter of 5 nm or more and less than 100 nm is represented by V2, V1/V2 is preferably 0.01 or more and 0.10 or less, more preferably 0.01 or more and 0.08 or less and particularly preferably 0.01 or more and 0.05 or less. Graphite having a V1/V2 ratio of 0.01 or less is too high in the process cost in the production thereof. The pore volumes V1 and V2 can be obtained, for example, by analyzing with a method such as the BJH method the adsorption isotherm obtained by the nitrogen adsorption measurement of graphite.

The method for making the volume ratio V1/V2 be 0.10 or less is not particularly limited; examples of a method capable of preparing graphite having such a volume ratio include: a method in which pulverization is performed for a longer time and with a smaller force than the conventional pulverization conditions; a method in which a thermo-oxidative treatment is performed in an oxygen atmosphere; a method in which a mixed solution prepared by dissolving or dispersing in a solvent an organic substance to be carbonaceous by heat treatment and a carbon material are mixed together, then the solvent is removed from the resulting mixture to prepare a carbon-organic substance mixture, and then the carbon-organic substance mixture is heat treated in an inert atmosphere to carbonize the organic substance; a CVD (chemical vapor deposition) method in which a hydrocarbon such as methane is vapor-deposited on a carbon material under heating; and a solid phase mixing method in which carbon particles and an organic compound are mixed together as solids, then a mechanical energy is exerted on the resulting mixture and then the mixture is heat treated to be carbonized. In any of these cases, it is preferable to regulate the particle size by performing disintegration and classification after the treatment of reducing the pores.

Additionally, the interlayer distance ($d_{200}$) of graphite as a negative electrode active material is preferably 0.336 nm or more and 0.337 nm or less. Graphite having an interlayer distance falling within such a range is high in surface wettability and can compensate for the lack of lithium ion on the surface.

Graphite is not particularly limited; examples of the method capable of preparing graphite include: a method in which an easily carbonizable material obtained from natural carbon, petroleum coke, coal pitch coke or the like is heat treated at a high temperature of 900° C. or higher and 3000° C. or lower; and a method in which a material such as a thermoplastic resin, naphthalene, anthracene, phenanthrene, coal tar and tar pitch is beforehand heat treated with an apparatus such as an autoclave and pulverized, and then the pulverized substance is calcined in an inert atmosphere set at 800° C. or higher. In any of these cases, by further regulating the particle size through performing disintegration and classification after the particle size is regulated by the pulverization subsequent to the preparation, graphite usable as a negative electrode active material can be obtained.

In graphite as the negative electrode active material in the present invention, the average particle size obtained with a laser diffraction/scattering particle size distribution analyzer is preferably 3 µm or more and 30 µm or less, more preferably 3 µm or more and 25 µm or less and particularly preferably 5 µm or more and 20 µm or less. When the average particle size exceeds 30 µm, asperities tends to be formed on the electrode, and hence the battery properties are degraded, or the diffusion length in the active material is made longer and thus problems may occur in the charge/discharge properties. When the average particle size is less than 3 µm, graphite comes to be hardly crushed and the increase of the density tends to be difficult. It is to be noted that the particle size distribution can be measured by dispersing a sample in purified water containing a surfactant with a laser diffreaction/scattering particle size distribution analyzer, and the average particle size is calculated as the 50% cumulative particle size (50% D).

Additionally, in graphite as the negative electrode active material in the present invention, the specific surface area obtained by using the BET method (Brunauer-Emmet-Teller) from the adsorption isotherm obtained by the nitrogen adsorption measurement at 77K is preferably 1 $m^2$/g or more and 10 $m^2$/g or less. When the specific surface area is less than 1 $m^2$/g, the reaction area between the active material and lithium ion is decreased, and hence the charge/discharge properties may be aggravated. When the specific surface area exceeds 10 $m^2$/g, the reaction with the electrolyte tends to occur, and hence there is possibility that the irreversible capacity is increased and the operating life property is aggravated.

The method for preparing the negative electrode is not particularly limited. For example, a negative electrode mixture slurry is prepared by a method in which a solvent containing a binder as dissolved or dispersed therein and a negative electrode active material are sufficiently kneaded and dispersed by using a common kneading/dispersing method using an apparatus such as a ball mill or a planetary mixer, or a method in which a solvent containing a resistive substance and a binder as dissolved or dispersed therein and a negative electrode active material are sufficiently kneaded and dispersed by using a common kneading/dispersing method using an apparatus such as a ball mill or a planetary mixer. Subsequently, a current collector made of a metal foil such as a copper foil was coated with the resulting negative electrode mixture slurry by using a coating machine, and vacuum dried, for example, at an appropriate temperature around 120° C., compression molded by using a pressing machine and then the resulting coated metal foil is cut or punched to an intended size. Thus, an intended negative electrode can be prepared.

The solvent used in the preparation of the negative electrode mixture slurry is not particularly limited; example of such a solvent include: N-methyl-2-pyrrolidone (NMP), ethylene glycol, toluene and xylene.

Additionally, the above-described binder is not particularly limited; examples of the binder include: styrene-butadiene copolymer; ethylenically unsaturated carboxylic acid esters such as methyl(meth)acrylate, ethyl(meth)acrylate, butyl(meth)acrylate, (meth)acrylonitrile and hydroxyethyl(meth)acrylate; ethylenically unsaturated carboxylic acids such as acrylic acid, methacrylic acid, itaconic acid, fumaric acid and maleic acid; polymer compounds each having a large ionic conductivity such as polyvinylidene fluoride, polyethylene oxide, polyepichlorohydrin, polyphosphazene and polyacrylonitrile. The content of the binder is preferably set at 1 part by weight or more and 15 parts by weight or less in relation to 100 parts by weight of the total amount of the negative electrode active material and the binder in the present invention. When the content is less than 1 part by weight, there is a possibility that the electrode is exfoliated, and when the content exceeds 15 parts by weight, the direct current resistance (DCR) may be increased.

In the preparation of the positive electrode, first a binder dissolved or dispersed in an appropriate solvent is added to a positive electrode active material, the resulting mixture is sufficiently kneaded and dispersed by using a common kneading/dispersing method using an apparatus such as a ball mill or a planetary mixer, and thus a positive electrode mixture slurry is prepared. Subsequently, a current collector made of a metal foil such as an aluminum foil was coated with the resulting positive electrode mixture slurry by using a coating machine, and vacuum dried at 120° C., and compression molded. Then, the resulting coated metal foil is cut or punched to an intended size, and thus, an intended positive electrode can be prepared.

In the preparation of the positive electrode, it is preferable to add a conductive aid, where necessary, for the purpose of reducing the direct current resistance (DCR). The conductive aid is not particularly limited; examples of the usable conductive aid include: highly conductive powdery carbon, highly conductive scale-like carbon and highly conductive amorphous carbon such as carbon black. These may be used in combination. The content of the conductive aid is preferably set at 0 part by weight or more and 15 parts by weight or less in relation to 100 parts by weight of the total amount of the positive electrode active material and the conductive aid in the present invention. When the content exceeds 15 pars by weight, there is a possibility that the DCR reduction effect is small and only the capacity is remarkably decreased.

For the purpose of obtaining the positive electrode active material, first powders each set at a predetermined compositional proportion are pulverized and mixed together with a mechanical method using an apparatus such as a ball mill. The pulverization and mixing may adopt either a dry method or a wet method. The particle size of the pulverized raw material powder is preferably 1 μm or less and more preferably 0.3 μm or less. It is preferable to further granulate, by spray drying, the raw material powder pulverized as described above. The thus obtained powder is fired at 850 to 1100° C. and preferably at 900 to 1050° C. The atmosphere for the firing can be an atmosphere of an oxidative gas such as oxygen or air, an atmosphere of an inert gas such as nitrogen or argon, or an atmosphere prepared by mixing these gases.

The electrolyte is prepared by dissolving a lithium salt serving as a supporting electrolyte in a nonaqueous solvent. Preferably, the nonaqueous solvent is mainly composed of linear or cyclic carbonates, and with such a nonaqueous solvent, esters, ethers or the like can also be mixed. Examples of the carbonates include: ethylene carbonate (EC), propylene carbonate, butylene carbonate, dimethyl carbonate (DMC), diethyl carbonate (DEC), methyl ethyl carbonate and diethyl carbonate. These solvents can be used each alone or as mixtures of two or more thereof.

The lithium salt supplies lithium ions migrating in the electrolyte due to the charge/discharge of the battery. The lithium salts such as $LiClO_4$, $LiCF_3SO_3$, $LiPF_6$, $LiBF_4$ and $LiAsF_6$ can be used each alone or as mixtures of two or more thereof. The concentration of the lithium salt is preferably set at 0.7 M or more and 1.5 M or less in the electrolyte. When the concentration deviates from the above-described range, the DCR tends to increase.

Additionally, a cyclic carbonate having an unsaturated group may be added to the electrolyte. Examples of the cyclic carbonate having an unsaturated group may include: vinylene carbonate and vinylethylene carbonate. The addition amount of the cyclic carbonate is preferably set at 0.1 part by weight or more and 5 parts by weight or less in relation to 100 parts by weight of the amount of the whole electrolyte. When the addition amount is less than the above-described range, no addition effect is attained, and when the addition amount exceeds 5 parts by weight, the DCR tends to be large.

The separator is not particularly limited as long as the separator can prevent the short-circuiting between the positive electrode and the negative electrode. Examples of the usable separator include non-woven fabrics, cloths and porous films mainly composed of polyolefin such as polyethylene or polypropylene, and combinations of these fabrics, cloths and porous films.

The lithium ion battery of the present invention can be produced, for example, by disposing so as to face each other the negative electrode and the positive electrode as described above through the intermediary of the separator and by injecting the electrolyte. The structure of the lithium ion battery of the present invention is not particularly limited; usually, the positive electrode, the negative electrode and the separator separating these electrodes can be rolled up together into a rolled-up electrode group, or the positive electrode, the negative electrode and the separator can be laminated into a laminated electrode group.

The present invention can provide a lithium ion battery attaining satisfactory properties at large current even when the mixture layers are thick and being made high in energy density. Specifically, a lithium ion battery having an energy density of 80 Wh/kg or more is obtained, and hence such a lithium ion battery is suitable as a battery for use in applications requiring high output power such as electric automobiles or plug-in hybrid automobiles.

EXAMPLES

Hereinafter, the present invention is described in more detail with reference to Examples and Comparative Examples. However, following Examples are presented solely for the purpose of exemplifying the present invention and the present invention is not limited to following Examples.

Example 1

A negative electrode active material was synthesized according to the following procedures. First, by using an autoclave, a coal tar from coal was heat treated at 400° C. to yield a green coke. The green coke was pulverized, and then calcined at 2800° C. in an inert atmosphere to yield graphite having a graphite interlayer distance ($d_{200}$) of 0.3350 nm. The graphite was pulverized with an impact disintegrator equipped with a classifier, and then coarse powder was removed with a 300-mesh sieve to yield graphite particles. In this case, the average particle size was found to be 17.2 μm and the specific surface area was found to be 1.6 m²/g.

Successively, a positive electrode active material was synthesized according to the following procedures. As raw materials, nickel oxide, manganese oxide and cobalt oxide were used and were weighed out so as for the atomic ratio of Ni:Mn:Co to be 1:1:1, and were pulverized and mixed together with a wet pulverizer. Next, as a binder, polyvinyl alcohol (PVA) was added to the pulverized mixed powder, and the resulting pulverized mixed powder was granulated with a spray dryer. The obtained granulated powder was placed in a high-purity alumina vessel, subjected to a preliminary firing at 600° C. for 12 hours in order to evaporate PVA, air cooled and then disintegrated. Further, to the disintegrated powder, lithium hydroxide monohydrate was added so as to give the atomic ratio Li:transition metal (Ni, Mn, Co)=1:1, and the resulting mixture was sufficiently mixed. The mixed powder was placed in a high-purity alumina vessel and subjected to a final firing at 900° C. for 6 hours. The obtained positive electrode active material was disintegrated with a ball mill and then classified. The average particle size of the resulting positive electrode active material was found to be 6 μm.

In present Example, the spacing $d_{200}$ of the (002) planes of graphite was measured with an X-ray diffractometer RU200B manufactured by Rigaku Corporation. As the X-ray source, the Cu Kα line was used (λ=0.15418 nm), and the diffraction angle was corrected with Si. The spacing can be derived with the Bragg formula by profile fitting of the obtained peaks.

The particle size (50% D) in present Example was examined with the laser diffraction/scattering particle size distribution analyzer LA-920 manufactured by Horiba, Ltd. As the light source, a 1-mW He—Ne laser was used. The dispersion medium for the graphite particles was ion-exchanged water containing two drops of a surfactant added thereto. The measurement sample was beforehand subjected to an ultrasonic wave treatment for 5 minutes or more. The measurement was performed while the particle aggregation was being prevented by further conducting an ultrasonic wave treatment during the measurement. The 50% cumulative particle size (50% D) obtained from the measurement results was taken as the average particle size.

The specific surface area of graphite as the negative electrode active material of the lithium ion battery in present Example was obtained as follows: graphite was vacuum dried at 120° C. for 3 hours, and then by using the BELSORP-mini manufactured by BEL Japan, Inc., an adsorption isotherm was obtained by a measurement based on the nitrogen adsorption at 77K with an equilibrium time of 300 seconds; the specific surface area was obtained by analyzing the adsorption isotherm with the BET method.

Next, a lithium ion battery was prepared as follows. FIG. 1 shows a cross sectional view of the lithium ion battery of present Example. In FIG. 1, reference numeral 10 denotes the positive electrode, 11 the separator, 12 the negative electrode, 13 a battery can, 14 a positive electrode tab, 15 a negative electrode tab, 16 an inner lid, 17 a internal pressure release valve, 18 a gasket, 19 a PTC element and 20 a battery lid.

First, the positive electrode was prepared. To 86.0 parts by weight of the positive electrode active material, powdery carbon and acetylene black were added as conductive agents in amounts of 6.0 parts by weight and 2.0 parts by weight, respectively, and a solution beforehand prepared by dissolving 6.0 parts by weight of PVDF as a binder in NMP was added; the resulting mixture was further mixed with a planetary mixer to prepare a positive electrode mixture slurry. The both sides of a current collector made of a 20-μm thick aluminum foil were coated with the resulting slurry uniformly and equally by using a coating machine. After coating, the coated foil was compression molded with a roll pressing machine to prepare the positive electrode. In this case, a regulation was performed in such a way that the one-side thickness of the mixture layer of the positive electrode was 60 μm and the product A×B between the mixture layer thickness A and the density B ($g/cm^3$) of the positive electrode mixture layer was 192.

Next, the negative electrode was prepared. To 91.6 parts by weight of the graphite as the negative electrode active material, a solution prepared by dissolving 8.4 parts by weight of PVDF as a binder in NMP was added, and the resulting mixture was further mixed with a planetary mixer to prepare a negative electrode mixture slurry. The both sides of a current collector made of a 10-μm thick rolled copper foil were coated with the resulting slurry uniformly and equally by using a coating machine After coating, the coated foil was compression molded with a roll pressing machine to prepare the negative electrode. In this case, a regulation was performed in such a way that the one-side thickness of the mixture layer of the negative electrode was 60 μm and the product C×D between the mixture layer thickness C and the density D ($g/cm^3$) of the positive electrode mixture layer was 90.

Then, the positive electrode and the negative electrode were cut to the intended sizes, and a current collecting tab was ultrasonically welded to each of the portions uncoated with the mixtures of the positive and negative electrodes. As the current collecting tabs, an aluminum lead strip and a nickel lead strip were used for the positive electrode and the negative electrode, respectively. Subsequently, while a separator made of a 30-μm thick porous polyethylene film was being sandwiched between the positive electrode and the negative electrode, the positive and negative electrodes and the separator were rolled up together. The resulting rolled body was inserted into a battery can, the negative electrode tab was connected to the bottom of the battery can by resistance welding, and the positive electrode lid was connected to the positive electrode tab by ultrasonic welding. Next, an electrolyte prepared by dissolving $LiPF_6$ in a content of 1 mol/L in a mixed solvent having a composition of EC:DMC:DEC=1:1:1 in volume ratio was injected into the battery can, and then the positive electrode lid was crimped to the battery can to seal the battery can, and thus an intended lithium ion battery was obtained.

Figure 2:
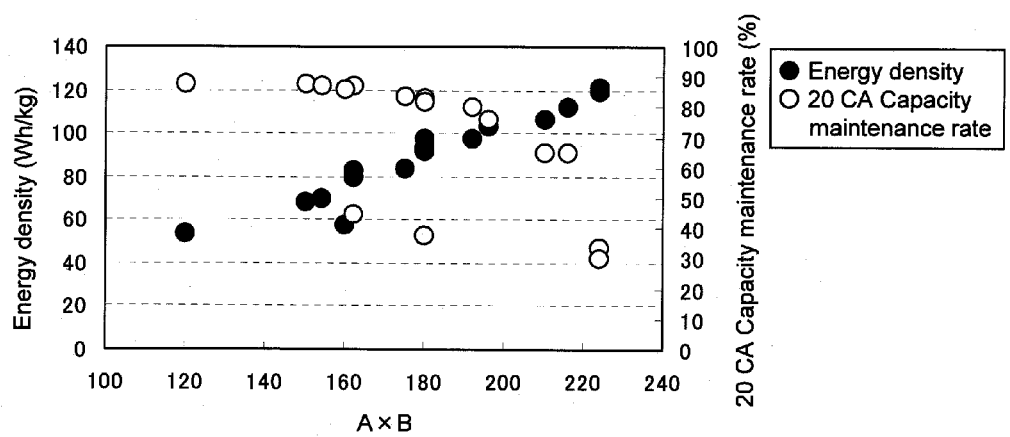
FIG. 2 is a graph showing the variations of the 20 CA capacity maintenance rate and the energy density each as a function of the product A×B between the thickness A and the density B of the positive electrode mixture layer, in a case where $LiNi_aMn_bCo_cM_dO_2$ was used as a positive electrode active material.

For the prepared lithium ion battery, first the DCR was measured to obtain the output power density of the battery. At around normal temperature (25° C.), the prepared battery was charged to 4.1 V at a current corresponding to 0.3 C, and then a constant voltage charge was performed at 4.1 V until the current came to be 0.03 C. After a 30-minute halt, a constant current discharge was performed to 2.7 V at a constant current corresponding to 0.3 C. Four cycles of these operations were performed to initialize the battery, and the energy density (Wh/kg) per the weight of the battery was obtained from the discharge capacity at the fourth cycle. Further, a constant current charge was performed at 0.3 C to 4.1 V, then a constant voltage charge was performed at 4.1 V until the current came to be 0.03 C, and then a discharge was performed to 2.7 V at a current of 20 CA. The value of (discharge capacity at 0.3 CA)/(discharge capacity at 20 CA)×100 was taken as the 20 CA capacity maintenance rate. The higher is this value, the better is the properties at large current. The results thus obtained are shown in Table 1 and FIG. 2.

Example 2

A lithium ion battery was prepared in the same manner as in Example 1 except that the thickness of the positive electrode mixture layer was set at 60 μm and the product A×B between the thickness A and the density B of the mixture layer was altered to 180, and the energy density (Wh/kg) and the 20 CA capacity maintenance rate were obtained. The results thus obtained are shown in Table 1 and FIG. 2.

Example 3

A lithium ion battery was prepared in the same manner as in Example 1 except that the thickness of the positive electrode mixture layer was set at 60 μm and the product A×B between the thickness A and the density B of the mixture layer was altered to 162, and the energy density (Wh/kg) and the 20 CA capacity maintenance rate were obtained. The results thus obtained are shown in Table 1 and FIG. 2.

Example 4

A lithium ion battery was prepared in the same manner as in Example 1 except that the thickness of the positive electrode mixture layer was set at 70 μm and the product A×B between the thickness A and the density B of the mixture layer was altered to 210, and the energy density (Wh/kg) and the 20 CA capacity maintenance rate were obtained. The results thus obtained are shown in Table 1 and FIG. 2.

Example 5

A lithium ion battery was prepared in the same manner as in Example 1 except that the thickness of the positive electrode mixture layer was set at 70 μm and the product A×B between the thickness A and the density B of the mixture layer was altered to 196, and the energy density (Wh/kg) and the 20 CA capacity maintenance rate were obtained. The results thus obtained are shown in Table 1 and FIG. 2.

Example 6

A lithium ion battery was prepared in the same manner as in Example 1 except that the thickness of the positive electrode mixture layer was set at 70 μm and the product A×B between the thickness A and the density B of the mixture layer was altered to 175, and the energy density (Wh/kg) and the 20 CA capacity maintenance rate were obtained. The results thus obtained are shown in Table 1 and FIG. 2.

Example 7

A lithium ion battery was prepared in the same manner as in Example 1 except that the thickness of the positive electrode mixture layer was set at 80 μm and the product A×B between the thickness A and the density B of the mixture layer was altered to 216, and the energy density (Wh/kg) and the 20 CA capacity maintenance rate were obtained. The results thus obtained are shown in Table 1 and FIG. 2.

Example 8

A lithium ion battery was prepared in the same manner as in Example 1 except that the thickness of the positive electrode mixture layer was set at 80 μm and the product A×B between the thickness A and the density B of the mixture layer was altered to 180, and the energy density (Wh/kg) and the 20 CA capacity maintenance rate were obtained. The results thus obtained are shown in Table 1 and FIG. 2.

Comparative Example 1

A lithium ion battery was prepared in the same manner as in Example 1 except that the thickness of the positive electrode mixture layer was set at 60 μm and the product A×B between the thickness A and the density B of the mixture layer was altered to 150, and the energy density (Wh/kg) and the 20 CA capacity maintenance rate were obtained. The results thus obtained are shown in Table 1 and FIG. 2.

Comparative Example 2

A lithium ion battery was prepared in the same manner as in Example 1 except that the thickness of the positive electrode mixture layer was set at 70 μm and the product A×B between the thickness A and the density B of the mixture layer was altered to 224, and the energy density (Wh/kg) and the 20 CA capacity maintenance rate were obtained. The results thus obtained are shown in Table 1 and FIG. 2.

Comparative Example 3

A lithium ion battery was prepared in the same manner as in Example 1 except that the thickness of the positive electrode mixture layer was set at 70 μM and the product A×B between the thickness A and the density B of the mixture layer was altered to 154, and the energy density (Wh/kg) and the 20 CA capacity maintenance rate were obtained. The results thus obtained are shown in Table 1 and FIG. 2.

Comparative Example 4

A lithium ion battery was prepared in the same manner as in Example 1 except that the thickness of the positive electrode mixture layer was set at 80 μm and the product A×B between the thickness A and the density B of the mixture layer was altered to 224, and the energy density (Wh/kg) and the 20 CA capacity maintenance rate were obtained. The results thus obtained are shown in Table 1 and FIG. 2.

Comparative Example 5

A lithium ion battery was prepared in the same manner as in Example 1 except that the thickness of the positive electrode mixture layer was set at 50 μm and the product A×B between the thickness A and the density B of the mixture layer was altered to 160, and the energy density (Wh/kg) and the 20 CA capacity maintenance rate were obtained. The results thus obtained are shown in Table 1 and FIG. 2.

Comparative Example 6

A lithium ion battery was prepared in the same manner as in Example 1 except that the thickness of the positive electrode mixture layer was set at 50 μm and the product A×B between the thickness A and the density B of the mixture layer was altered to 120, and the energy density (Wh/kg) and the 20 CA capacity maintenance rate were obtained. The results thus obtained are shown in Table 1 and FIG. 2.

Comparative Example 7

A lithium ion battery was prepared in the same manner as in Example 1 except that the thickness of the positive electrode mixture layer was set at 100 μM and the product A×B between the thickness A and the density B of the mixture layer was altered to 180, and the energy density (Wh/kg) and the 20 CA capacity maintenance rate were obtained. The results thus obtained are shown in Table 1 and FIG. 2.

Comparative Example 8

A lithium ion battery was prepared in the same manner as in Example 1 except that the thickness of the positive electrode mixture layer was set at 100 μm and the product A×B between the thickness A and the density B of the mixture layer was altered to 162, and the energy density (Wh/kg) and the 20 CA capacity maintenance rate were obtained. The results thus obtained are shown in Table 1 and FIG. 2.

TABLE 1

| | Thickness of positive electrode mixture layer (μm) | A × B | Thickness of negative electrode mixture layer (μm) | C × D | (A × B)/(C × D) | Energy density of battery (Wh/kg) | 20 CA capacity maintenance rate (%) |
|---|---|---|---|---|---|---|---|
| Example 1 | 60 | 192 | 60 | 90 | 2.13 | 98 | 80 |
| Example 2 | 60 | 180 | | | 2.00 | 92 | 83 |
| Example 3 | 60 | 162 | | | 1.80 | 80 | 87 |
| Example 4 | 70 | 210 | | | 2.33 | 107 | 65 |
| Example 5 | 70 | 196 | | | 2.26 | 103 | 76 |
| Example 6 | 70 | 175 | | | 1.94 | 84 | 84 |
| Example 7 | 80 | 216 | | | 2.40 | 112 | 65 |
| Example 8 | 80 | 180 | | | 2.00 | 94 | 82 |

TABLE 1-continued

|  | Thickness of positive electrode mixture layer (μm) | A × B | Thickness of negative electrode mixture layer (μm) | C × D | (A × B)/ (C × D) | Energy density of battery (Wh/kg) | 20 CA capacity maintenance rate (%) |
|---|---|---|---|---|---|---|---|
| Comparative Example 1 | 60 | 150 |  |  | 1.67 | 68 | 88 |
| Comparative Example 2 | 70 | 224 |  |  | 2.49 | 120 | 34 |
| Comparative Example 3 | 70 | 154 |  |  | 1.71 | 70 | 87 |
| Comparative Example 4 | 80 | 224 |  |  | 2.5 | 121 | 30 |
| Comparative Example 5 | 50 | 160 |  |  | 1.8 | 58 | 86 |
| Comparative Example 6 | 50 | 120 |  |  | 1.3 | 54 | 88 |
| Comparative Example 7 | 100 | 180 |  |  | 2 | 98 | 38 |
| Comparative Example 8 | 100 | 162 |  |  | 1.8 | 83 | 45 |

As shown in Table 1, Examples 1 to 8 in each of which the product A×B between thickness A and the density B of the positive electrode mixture layer was 220 or less were improved in the 20 CA capacity maintenance rate as compared to Comparative Examples 2 and 4 in each of which the product A×B was larger. Additionally, from the results of Examples 1 to 8 and the results of Comparative Examples 1 and 3 in Table 1, it has been found that in the cases where the product A×B between thickness A and the density B of the positive electrode mixture layer is 160 or more, the 20 CA capacity maintenance rate is not varied, but the energy density is improved as compared to the cases where the product A×B was less than 160. Additionally, as shown by Comparative Examples 5 and 6, it has been revealed that when the thickness of the positive electrode mixture layer is less than 60 μm, the CA capacity maintenance rate is not varied, but the energy density is decreased as compared to Examples 1 to 8. From the results of Comparative Examples 7 and 8, it has been found that with the increase of the thickness of the positive electrode mixture layer, the CA capacity maintenance rate is more decreased than in the cases of Examples 1 to 8.

Additionally, as is clear from the results of Examples 1, 2, 5 and 8 and the results of Examples 3, 6 and 7, when the (A×B)/(C×D) value falls within a range of 2.0 or more and 2.3 or less, the balance between the 20 CA capacity maintenance rate and the energy density can be said to be particularly preferable.

Example 9

Figure 3:
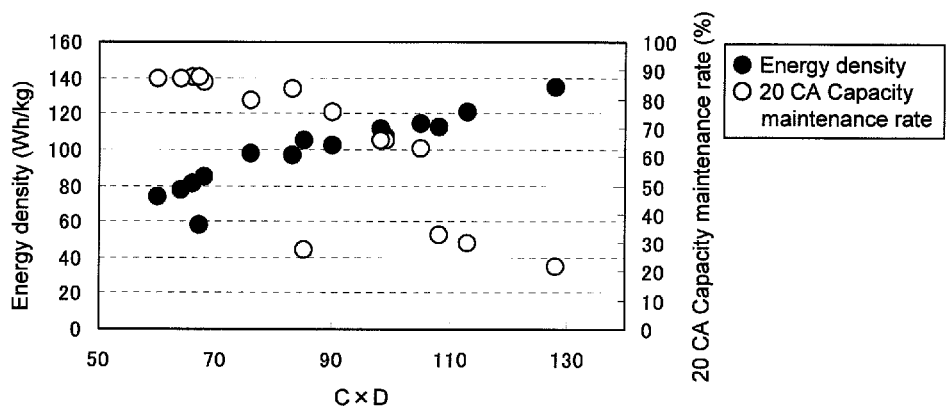
FIG. 3 is a graph showing the variations of the 20 CA capacity maintenance rate and the energy density each as a function of the product C×D between the thickness C and the density D of the negative electrode mixture layer, in a case where $LiNi_aMn_bCo_cM_dO_2$ was used as a positive electrode active material.

A lithium ion battery was prepared in the same manner as in Example 5 except that the thickness of the negative electrode mixture layer was set at 40 μm and the product C×D between the thickness C and the density D of the mixture layer was altered to 76, and the energy density (Wh/kg) and the 20 CA capacity maintenance rate were obtained. The results thus obtained are shown in Table 2 and FIG. 3.

Example 10

A lithium ion battery was prepared in the same manner as in Example 5 except that the thickness of the negative electrode mixture layer was set at 40 μM and the product C×D between the thickness C and the density D of the mixture layer was altered to 68, and the energy density (Wh/kg) and the 20 CA capacity maintenance rate were obtained. The results thus obtained are shown in Table 2 and FIG. 3.

Example 11

A lithium ion battery was prepared in the same manner as in Example 5 except that the thickness of the negative electrode mixture layer was set at 40 μm and the product C×D between the thickness C and the density D of the mixture layer was altered to 66, and the energy density (Wh/kg) and the 20 CA capacity maintenance rate were obtained. The results thus obtained are shown in Table 2 and FIG. 3.

Example 12

A lithium ion battery was prepared in the same manner as in Example 5 except that the thickness of the negative electrode mixture layer was set at 55 μm and the product C×D between the thickness C and the density D of the mixture layer was altered to 99, and the energy density (Wh/kg) and the 20 CA capacity maintenance rate were obtained. The results thus obtained are shown in Table 2 and FIG. 3.

Example 13

A lithium ion battery was prepared in the same manner as in Example 5 except that the thickness of the negative electrode mixture layer was set at 55 μm and the product C×D between the thickness C and the density D of the mixture layer was altered to 83, and the energy density (Wh/kg) and the 20 CA capacity maintenance rate were obtained. The results thus obtained are shown in Table 2 and FIG. 3.

Example 14

A lithium ion battery was prepared in the same manner as in Example 5 except that the thickness of the negative electrode mixture layer was set at 75 μm and the product C×D between the thickness C and the density D of the mixture layer was altered to 105, and the energy density (Wh/kg) and the 20 CA capacity maintenance rate were obtained. The results thus obtained are shown in Table 2 and FIG. 3.

Example 15

A lithium ion battery was prepared in the same manner as in Example 5 except that the thickness of the negative electrode mixture layer was set at 75 μm and the product C×D between the thickness C and the density D of the mixture layer was altered to 98, and the energy density (Wh/kg) and the 20 CA capacity maintenance rate were obtained. The results thus obtained are shown in Table 2 and FIG. 3.

Comparative Example 9

A lithium ion battery was prepared in the same manner as in Example 5 except that the thickness of the negative electrode mixture layer was set at 40 μm and the product C×D between the thickness C and the density D of the mixture layer was altered to 60, and the energy density (Wh/kg) and the 20 CA capacity maintenance rate were obtained. The results thus obtained are shown in Table 2 and FIG. 3.

Comparative Example 10

A lithium ion battery was prepared in the same manner as in Example 5 except that the thickness of the negative electrode mixture layer was set at 55 μm and the product C×D between the thickness C and the density D of the mixture layer was altered to 108, and the energy density (Wh/kg) and the 20 CA capacity maintenance rate were obtained. The results thus obtained are shown in Table 2 and FIG. 3.

Comparative Example 11

A lithium ion battery was prepared in the same manner as in Example 5 except that the thickness of the negative electrode mixture layer was set at 55 μm and the product C×D between the thickness C and the density D of the mixture layer was altered to 64, and the energy density (Wh/kg) and the 20 CA capacity maintenance rate were obtained. The results thus obtained are shown in Table 2 and FIG. 3.

Comparative Example 12

A lithium ion battery was prepared in the same manner as in Example 5 except that the thickness of the negative electrode mixture layer was set at 75 μm and the product C×D between the thickness C and the density D of the mixture layer was altered to 113, and the energy density (Wh/kg) and the 20 CA capacity maintenance rate were obtained. The results thus obtained are shown in Table 2 and FIG. 3.

Comparative Example 13

A lithium ion battery was prepared in the same manner as in Example 5 except that the thickness of the negative electrode mixture layer was set at 35 μm and the product C×D between the thickness C and the density D of the mixture layer was altered to 67, and the energy density (Wh/kg) and the 20 CA capacity maintenance rate were obtained. The results thus obtained are shown in Table 2 and FIG. 3.

Comparative Example 14

A lithium ion battery was prepared in the same manner as in Example 5 except that the thickness of the negative electrode mixture layer was set at 85 μm and the product C×D between the thickness C and the density D of the mixture layer was altered to 128, and the energy density (Wh/kg) and the 20 CA capacity maintenance rate were obtained. The results thus obtained are shown in Table 2 and FIG. 3.

Comparative Example 15

A lithium ion battery was prepared in the same manner as in Example 5 except that the thickness of the negative electrode mixture layer was set at 85 μm and the product C×D between the thickness C and the density D of the mixture layer was altered to 85, and the energy density (Wh/kg) and the 20 CA capacity maintenance rate were obtained. The results thus obtained are shown in Table 2 and FIG. 3.

TABLE 2

| | Thickness of negative electrode mixture layer (μm) | C × D | Thickness of positive electrode mixture layer (μm) | A × B | (A × B)/(C × D) | Energy density of battery (Wh/kg) | 20 CA capacity maintenance rate (%) |
|---|---|---|---|---|---|---|---|
| Example 9 | 40 | 76 | 70 | 196 | 2.58 | 98 | 80 |
| Example 10 | 40 | 68 | | | 2.88 | 85 | 86 |
| Example 11 | 40 | 66 | | | 2.97 | 81 | 88 |
| Example 12 | 55 | 99 | | | 1.98 | 107 | 66 |
| Example 13 | 55 | 83 | | | 2.36 | 97 | 84 |
| Example 14 | 75 | 105 | | | 1.87 | 115 | 63 |
| Example 15 | 75 | 98 | | | 2.00 | 112 | 66 |
| Comparative Example 9 | 40 | 60 | | | 3.27 | 74 | 87 |
| Comparative Example 10 | 55 | 108 | | | 1.81 | 113 | 33 |
| Comparative Example 11 | 55 | 64 | | | 3.06 | 78 | 87 |
| Comparative Example 12 | 75 | 113 | | | 1.73 | 121 | 30 |
| Comparative Example 13 | 35 | 67 | | | 2.93 | 58 | 88 |
| Comparative Example 14 | 85 | 128 | | | 1.53 | 135 | 22 |
| Comparative Example 15 | 85 | 85 | | | 2.31 | 105 | 28 |

As shown in Table 2, Examples 9 to 15 in each of which the product C×D between the thickness C and the density D of the negative electrode mixture layer was 105 or less were improved in the 20 CA capacity maintenance rate as compared to Comparative Examples 10 and 12 in each of which the product C×D was larger. Additionally, from the results of Examples 9 to 15 and the results of Comparative Examples 9 and 11 in Table 2, it has been found that in the cases where the product C×D between the thickness C and the density D of the negative electrode mixture layer is 65 or more, the 20 CA capacity maintenance rate is not varied, but the energy density is improved as compared to the cases where the product C×D is less than 65. Additionally, as shown by Comparative Example 13, it has been revealed that when the thickness of the negative electrode mixture layer is less than 40 µm, the 20 CA capacity maintenance rate is not varied, but the energy density is decreased as compared to Examples 9 to 15. From the results of Comparative Examples 14 and 15, it has been found that with the increase of the thickness of the negative electrode mixture layer, the 20 CA capacity maintenance rate is more decreased than in the cases of Examples 9 to 15.

Additionally, as is clear from the results of Example 15 and the results of Examples 9 to 12 and 14, when the (A×B)/(C×D) value falls within a range of 2.0 or more and 2.3 or less, the balance between the 20 CA capacity maintenance rate and the energy density can be said to be particularly preferable.

Example 16

Figure 4:
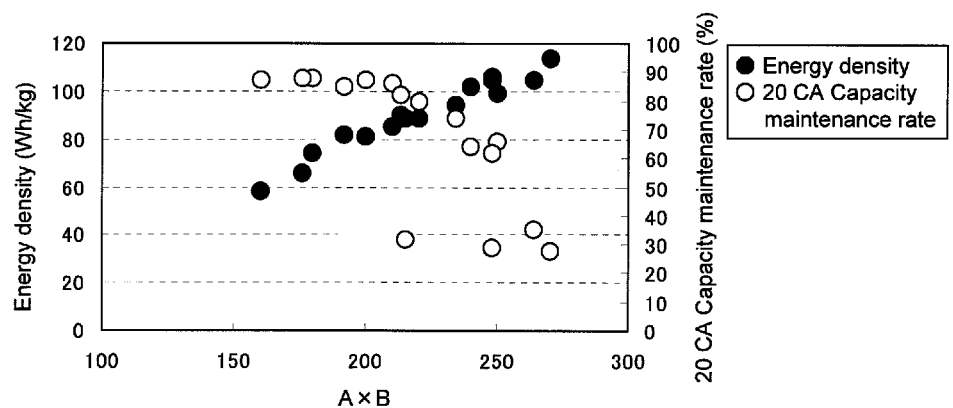
FIG. 4 is a graph showing the variations of the 20 CA capacity maintenance rate and the energy density each as a function of the product A×B between the thickness A and the density B of the positive electrode mixture layer, in a case where $LiMPO_4$ was used as a positive electrode active material.

A lithium ion battery was prepared in the same manner as in Example 5 except that: lithium dihydrogen phosphate and iron oxalate were weighed out so as for the atomic ratio of Fe:P to be 1:1 and placed in a zirconia pot, and then zirconia grinding balls were place in the pot and the resulting mixture was mixed for 30 minutes by using a planetary ball mill at the rotation number set at the level 3; the resulting mixed powder was placed in an alumina crucible and subjected to a preliminary firing in a flow of argon at 0.3 L/min at 400° C. for 10 hours; the preliminarily fired powder was once disintegrated with an agate mortar, and the disintegrated powder was again placed in the alumina crucible and subjected to a final firing in a flow of argon at 0.3 L/min at 700° C. for 10 hours; and then, the obtained powder was disintegrated with an agate mortar and subjected to a particle size regulation with a 45-µm mesh sieve, and the thus obtained material was used as a positive electrode active material. In this case, a setting was performed in such a way that the one-side thickness A of the positive electrode mixture layer was 100 µm and the product A×B between the thickness A and the density B (g/cm$^3$) of the mixture layer of the positive electrode mixture layer was 220. For the resulting lithium ion battery, the energy density (Wh/kg) and the 20 CA capacity maintenance rate were obtained. The results thus obtained are shown in Table 3 and FIG. 4.

Example 17

A lithium ion battery was prepared in the same manner as in Example 16 except that the thickness of the positive electrode mixture layer was set at 100 µm and the product A×B between the thickness A and the density B of the mixture layer was altered to 210, and the energy density (Wh/kg) and the 20 CA capacity maintenance rate were obtained. The results thus obtained are shown in Table 3 and FIG. 4.

Example 18

A lithium ion battery was prepared in the same manner as in Example 16 except that the thickness of the positive electrode mixture layer was set at 100 µm and the product A×B between the thickness A and the density B of the mixture layer was altered to 200, and the energy density (Wh/kg) and the 20 CA capacity maintenance rate were obtained. The results thus obtained are shown in Table 3 and FIG. 4.

Example 19

A lithium ion battery was prepared in the same manner as in Example 16 except that the thickness of the positive electrode mixture layer was set at 125 µm and the product A×B between the thickness A and the density B of the mixture layer was altered to 250, and the energy density (Wh/kg) and the 20 CA capacity maintenance rate were obtained. The results thus obtained are shown in Table 3 and FIG. 4.

Example 20

A lithium ion battery was prepared in the same manner as in Example 16 except that the thickness of the positive electrode mixture layer was set at 125 µm and the product A×B between the thickness A and the density B of the mixture layer was altered to 234, and the energy density (Wh/kg) and the 20 CA capacity maintenance rate were obtained. The results thus obtained are shown in Table 3 and FIG. 4.

Example 21

A lithium ion battery was prepared in the same manner as in Example 16 except that the thickness of the positive electrode mixture layer was set at 125 µm and the product A×B between the thickness A and the density B of the mixture layer was altered to 213, and the energy density (Wh/kg) and the 20 CA capacity maintenance rate were obtained. The results thus obtained are shown in Table 3 and FIG. 4.

Example 22

A lithium ion battery was prepared in the same manner as in Example 16 except that the thickness of the positive electrode mixture layer was set at 150 µm and the product A×B between the thickness A and the density B of the mixture layer was altered to 248, and the energy density (Wh/kg) and the 20 CA capacity maintenance rate were obtained. The results thus obtained are shown in Table 3 and FIG. 4.

Example 23

A lithium ion battery was prepared in the same manner as in Example 16 except that the thickness of the positive electrode mixture layer was set at 150 µm and the product A×B between the thickness A and the density B of the mixture layer was altered to 240, and the energy density (Wh/kg) and the 20 CA capacity maintenance rate were obtained. The results thus obtained are shown in Table 3 and FIG. 4.

Comparative Example 16

A lithium ion battery was prepared in the same manner as in Example 16 except that the thickness of the positive electrode mixture layer was set at 100 µm and the product A×B between the thickness A and the density B of the mixture layer was altered to 180, and the energy density (Wh/kg) and the 20 CA capacity maintenance rate were obtained. The results thus obtained are shown in Table 3 and FIG. 4.

Comparative Example 17

A lithium ion battery was prepared in the same manner as in Example 16 except that the thickness of the positive electrode mixture layer was set at 125 µm and the product A×B between the thickness A and the density B of the mixture layer was altered to 192, and the energy density (Wh/kg) and the 20

CA capacity maintenance rate were obtained. The results thus obtained are shown in Table 3 and FIG. 4.

Comparative Example 18

A lithium ion battery was prepared in the same manner as in Example 16 except that the thickness of the positive electrode mixture layer was set at 125 μm and the product A×B between the thickness A and the density B of the mixture layer was altered to 264, and the energy density (Wh/kg) and the 20 CA capacity maintenance rate were obtained. The results thus obtained are shown in Table 3 and FIG. 4.

Comparative Example 19

A lithium ion battery was prepared in the same manner as in Example 16 except that the thickness of the positive electrode mixture layer was set at 150 μm and the product A×B between the thickness A and the density B of the mixture layer was altered to 270, and the energy density (Wh/kg) and the 20 CA capacity maintenance rate were obtained. The results thus obtained are shown in Table 3 and FIG. 4.

Comparative Example 20

A lithium ion battery was prepared in the same manner as in Example 16 except that the thickness of the positive electrode mixture layer was set at 80 μm and the product A×B between the thickness A and the density B of the mixture layer was altered to 176, and the energy density (Wh/kg) and the 20 CA capacity maintenance rate were obtained. The results thus obtained are shown in Table 3 and FIG. 4.

Comparative Example 21

A lithium ion battery was prepared in the same manner as in Example 16 except that the thickness of the positive electrode mixture layer was set at 80 μm and the product A×B between the thickness A and the density B of the mixture layer was altered to 160, and the energy density (Wh/kg) and the 20 CA capacity maintenance rate were obtained. The results thus obtained are shown in Table 3 and FIG. 4.

Comparative Example 22

A lithium ion battery was prepared in the same manner as in Example 16 except that the thickness of the positive electrode mixture layer was set at 165 μm and the product A×B between the thickness A and the density B of the mixture layer was altered to 248, and the energy density (Wh/kg) and the 20 CA capacity maintenance rate were obtained. The results thus obtained are shown in Table 3 and FIG. 4.

Comparative Example 23

A lithium ion battery was prepared in the same manner as in Example 16 except that the thickness of the positive electrode mixture layer was set at 165 μm and the product A×B between the thickness A and the density B of the mixture layer was altered to 215, and the energy density (Wh/kg) and the 20 CA capacity maintenance rate were obtained. The results thus obtained are shown in Table 3 and FIG. 4.

TABLE 3

|  | Thickness of positive electrode mixture layer (μm) | A × B | Thickness of negative electrode mixture layer (μm) | C × D | (A × B)/(C × D) | Energy density of battery (Wh/kg) | 20 CA capacity maintenance rate (%) |
|---|---|---|---|---|---|---|---|
| Example 16 | 100 | 220 | 60 | 90 | 2.44 | 89 | 80 |
| Example 17 | 100 | 210 |  |  | 2.33 | 85 | 86 |
| Example 18 | 100 | 200 |  |  | 2.22 | 81 | 87 |
| Example 19 | 125 | 250 |  |  | 2.78 | 99 | 66 |
| Example 20 | 125 | 234 |  |  | 2.60 | 94 | 74 |
| Example 21 | 125 | 213 |  |  | 2.36 | 90 | 82 |
| Example 22 | 150 | 248 |  |  | 2.75 | 105 | 62 |
| Example 23 | 150 | 240 |  |  | 2.67 | 102 | 64 |
| Comparative Example 16 | 100 | 180 |  |  | 2.00 | 74 | 88 |
| Comparative Example 17 | 125 | 192 |  |  | 2.13 | 82 | 85 |
| Comparative Example 18 | 125 | 264 |  |  | 2.93 | 105 | 35 |
| Comparative Example 19 | 150 | 270 |  |  | 3.00 | 114 | 28 |
| Comparative Example 20 | 80 | 176 |  |  | 1.96 | 66 | 88 |
| Comparative Example 21 | 80 | 160 |  |  | 1.78 | 58 | 87 |
| Comparative Example 22 | 165 | 248 |  |  | 2.75 | 106 | 29 |
| Comparative Example 23 | 165 | 215 |  |  | 2.38 | 89 | 32 |

As shown in Table 3, Examples 16 to 23 in each of which the product A×B between the thickness A and the density B of the positive electrode mixture layer was 250 or less were improved in the 20 CA capacity maintenance rate as compared to Comparative Examples 18 and 19 in each of which the product A×B was larger. Additionally, from the results of Examples 16 to 23 and the results of Comparative Examples 16 and 17 in Table 3, it has been found that in the cases where the product A×B between the thickness A and the density B of the positive electrode mixture layer is 200 or more, the 20 CA capacity maintenance rate is not varied, but the energy density is improved as compared to the cases where the product A×B is less than 200. Additionally, as shown by Comparative Examples 20 and 21, it has been revealed that when the thickness of the positive electrode mixture layer is less than 100 μm, the 20 CA capacity maintenance rate is not varied, but the energy density is decreased as compared to Examples 16 to 23. From the results of Comparative Examples 22 and 23, it has been found that with the increase of the thickness of the positive electrode mixture layer, the CA capacity maintenance rate is more decreased than in the cases of Examples 16 to 23.

Additionally, as is clear from the results of Examples 16, 17, 20 and 21 and the results of Examples 18, 19, 22 and 23, when the (A×B)/(C×D) value falls within a range of 2.3 or more and 2.6 or less, the balance between the 20 CA capacity maintenance rate and the energy density can be said to be particularly preferable.

Example 24

A lithium ion battery was prepared in the same manner as in Example 1 except that carbon fiber was added in the positive electrode mixture slurry in place of powdery carbon, and the energy density (Wh/kg) and the 20 CA capacity maintenance rate were obtained. The results thus obtained are shown in Table 4.

Example 25

A lithium ion battery was prepared in the same manner as in Example 1 except that a negative electrode mixture slurry was prepared from 88.6 parts by weight of graphite as the negative electrode active material, 3.0 parts by weight of carbon fiber and a solution prepared by dissolving 8.4 parts by weight of PVDF as a binder, and the energy density (Wh/kg) and the 20 CA capacity maintenance rate were obtained. The results thus obtained are shown in Table 4.

TABLE 4

|  | Carbon fiber-added electrode | Addition amount (wt %) | Energy density of battery (Wh/kg) | 20 CA capacity maintenance rate (%) |
|---|---|---|---|---|
| Example 1 | None | 0 | 98 | 80 |
| Example 24 | Positive electrode | 6 | 96 | 85 |
| Example 25 | Negative electrode | 3 | 98 | 84 |

As shown in Table 4, it is clear that the cases (Examples 24 and 25) where carbon fiber is added to either of the positive electrode and the negative electrode are improved in the 20 CA capacity maintenance rate as compared to Example 1 where no carbon fiber is added.

Example 26

To a 30% by weight of toluene solution of graphite as the negative electrode active material in Example 1, pitch was further added so as to have a content of 15% by weight. The resulting solution was sufficiently mixed, then the toluene was removed under reduced pressure in an atmosphere set at 100° C., and thus a graphite/pitch composite body was prepared. The graphite/pitch composite body was increased in temperature to 1100° C. at a rate of 20° C./hour, and then maintained at 1100° C. for 1 hour to yield graphite particles. The obtained graphite particles were disintegrated with a cutter mill, and coarse powder was removed with a 300-mesh sieve. The graphite prepared by the above-described steps was such that the ratio V1/V2 between the pore volume (V1) of the pores having a pore diameter of 1 nm or more and less than 5 nm and the pore volume (V2) of the pores having a pore diameter of 5 nm or more and less than 100 nm was found to be 0.04 and the graphite interlayer distance ($d_{002}$) was found to be 0.345 nm. A lithium ion battery was prepared in the same manner as in Example 1 except that the graphite thus prepared was used as the negative electrode active material, and the energy density (Wh/kg) and the 20 CA capacity maintenance rate were obtained. The results thus obtained are shown in Table 5. It is to be noted that the V1/V2 of the negative electrode active material of Example 1 was 0.18.

Example 27

The graphite as the negative electrode active material in Example 1 was immersed in tar (softening temperature: 80° C.) for 3 hours, and then the graphite was taken out and increased in temperature to 900° C. and was maintained at 900° C. for 1 hour. The obtained graphite particles were disintegrated with a cutter mill, and coarse powder was removed with a 300-mesh sieve. The graphite thus prepared was such that the ratio V1/V2 between the pore volume (V1) of the pores having a pore diameter of 1 nm or more and less than 5 nm and the pore volume (V2) of the pores having a pore diameter of 5 nm or more and less than 100 nm was found to be 0.09 and the graphite interlayer distance ($d_{002}$) was found to be 0.3350 nm. A lithium ion battery was prepared in the same manner as in Example 1 except that the graphite thus prepared was used as the negative electrode active material, and the energy density (Wh/kg) and the 20 CA capacity maintenance rate were obtained. The results thus obtained are shown in Table 5.

The pore volumes were obtained as follows: graphite was vacuum dried at 120° C. for 3 hours, and then by using the BELSORP-mini manufactured by BEL Japan, Inc., an adsorption isotherm was obtained by a measurement based on the nitrogen adsorption at 77K with an equilibrium time of 300 seconds; the pore volumes were obtained by analyzing the adsorption isotherm with the BJH method. From the thus obtained pore volumes, the ratio V1/V2 between the pore volume (V1) of the pores having a pore diameter of 1 nm or more and less than 5 nm and the pore volume (V2) of the pores having a pore diameter of 5 nm or more and less than 100 nm is obtained.

TABLE 5

|  | V1/V2 | Energy density of battery (Wh/kg) | 20 CA capacity maintenance rate (%) |
|---|---|---|---|
| Example 1 | 0.18 | 98 | 80 |
| Example 26 | 0.04 | 98 | 87 |
| Example 27 | 0.09 | 98 | 84 |

As shown in Table 5, it has been revealed that in the cases (Example 26 and 27) where the ratio V1/V2 between the pore volume (V1) of the pores having a pore diameter of 1 nm or more and less than 5 nm and the pore volume (V2) of the pores having a pore diameter of 5 nm or more and less than 100 nm falls within a range of 0.01 or more and 0.10 or less, the 20 CA capacity maintenance rate is improved as compared to Example 1.

Example 28

A lithium ion battery was prepared in the same manner as in Example 1 except that the calcination temperature in the synthesis of the negative electrode active material was altered from 2800° C. to 2400° C. The interlayer distance ($d_{200}$) of the thus obtained graphite as the negative electrode active material was found to be 0.3362 nm. For the prepared lithium ion battery, the energy density (Wh/kg) and the 20 CA capacity maintenance rate were obtained. The results thus obtained are shown in Table 6.

TABLE 6

|  | Interlayer distance $d_{002}$(nm) | Energy density of battery (Wh/kg) | 20 CA capacity maintenance rate (%) |
|---|---|---|---|
| Example 1 | 0.3350 | 98 | 80 |
| Example 28 | 0.3362 | 97 | 87 |

As shown in Table 6, it has been revealed that by regulating the graphite interlayer distance ($d_{200}$) so as to fall within a range of 0.336 nm or more and 0.337 nm or less, the 20 CA capacity maintenance rate is further improved.

As described above, according to the lithium ion battery of the present invention, as compared to the conventional technology, even when the mixture layers are made thicker, more satisfactory properties can be obtained at large current, and a higher energy density can also be obtained.

What is claimed is:

1. A lithium ion battery comprising a positive electrode including a positive electrode mixture layer formed on a current collector, a negative electrode including a negative electrode mixture layer formed on a current collector and a liquid electrolyte, the positive electrode and the negative electrode being disposed through the intermediary of a separator,
wherein the positive electrode comprises as a positive electrode active material a lithium composite oxide represented by $LiNi_aMn_bCo_cM_dO_2$, wherein in the formula, M is at least one selected from the group consisting of Fe, V, Ti, Cu, Al, Sn, Zn, Mg, B and W, a+b+c+d=1, 0.2≤a≤0.8, 0.1≤b≤0.4, and 0≤d≤0.1,
an amount of the positive electrode active material in the positive electrode mixture layer is 79 wt % or more and 94 wt % or less,
the negative electrode comprises graphite as a negative electrode active material,
an amount of the negative electrode active material in the negative electrode mixture layer is 85 wt % or more and 99 wt % or less,
the interlayer distance ($d_{002}$) of the graphite is 0.335 nm or more and 0.338 nm or less,
the one-side thickness A (μm) of the positive electrode mixture layer is 60 or more and 85 or less,
the product A×B between the one-side thickness A and the density B (g/cm$^3$) of the positive electrode mixture layer is 160 μm·g/cm$^3$ or more and 220 μm·g/cm$^3$ or less,
the one-side thickness C (μm) of the negative electrode mixture layer is 40 or more and 75 or less, and
the product C×D between the one-side thickness C and the density D (g/cm$^3$) of the negative electrode mixture layer is 65 μm·g/cm$^3$ or more and 105 μm·g/cm$^3$ or less.

2. The lithium ion battery according to claim 1, wherein (A×B)/(C×D) is 2.0 or more and 2.3 or less.

3. The lithium ion battery according to claim 2, wherein at least one of the positive electrode mixture layer and the negative electrode mixture layer further comprises carbon fiber.

4. The lithium ion battery according to claim 2, wherein the pores possessed by the graphite are such that when the volume of the pores having a pore diameter of 1 nm or more and less than 5 nm is represented by V1 and the volume of the pores having a pore diameter of 5 nm or more and less than 100 nm is represented by V2, V1/V2 is 0.01 or more and 0.10 or less.

5. The lithium ion battery according to claim 2, wherein the interlayer distance ($d_{002}$) of the graphite is 0.336 nm or more and 0.337 nm or less.

* * * * *